Aug. 23, 1966   W. HORVAT ETAL   3,267,612
RETRACTABLE METAL DOOR SEAL
Filed April 15, 1964

INVENTORS
WALTER HORVAT
BY BUD D. LOBAUGH

Charles F. Dischler
ATTORNEY

United States Patent Office 3,267,612
Patented August 23, 1966

3,267,612
RETRACTABLE METAL DOOR SEAL
Walter Horvat, Santa Monica, Calif., and Bud D. Lobaugh, Marco, Fla., assignors to North American Aviation, Inc.
Filed Apr. 15, 1964, Ser. No. 359,889
1 Claim. (Cl. 49—316)

The present invention relates to a closure seal and more particularly to an expansible metal seal for sealing the edges of doors and movable access panels in high speed aerospace vehicles that are subjected to high temperatures.

In supersonic military aircraft of the type carrying internal stores such as bombs, rockets and missiles, it is not feasible to utilize bomb bay doors of the hinged or clam-shell type such as have been used for subsonic aircraft. Instead, such aircraft designs utilize retractable sliding doors to reduce the open position drag of the doors to a minimum since such doors do not extend down into the airstream. Due to the high external temperatures adjacent an aircraft operating at high supersonic velocities, the doors require sealing along their edges in order to prevent the entrance of heated air into the weapons bay.

The present invention is, therefore, directed to a retractable fluid actuated bellows seal for effectively sealing between the edge of a sliding door panel and the door frame of the weapons bay of a supersonic aircraft subjected to high operating temperatures.

Another object of the present invention is the provision of a sliding door seal which does not significantly increase the friction load on the door or appreciably increase the door operating time.

A further object of the invention resides in the provision of a metal seal that is simple to construct, and has good durability, ease of maintenance and adaptability to elevated temperatures.

Yet another object of the invention is the provision of a metallic seal having sufficient flexibility to accommodate a variable gap between the edge of a door panel and the edge of the weapons bay opening.

These and other objects and advantages of the present invention will become apparent to those skilled in the art upon reading the present specification and drawings, in which.

The present invention comprises a linear metal bellows having a normally flat retracted configuration adapted to be expanded by a fluid, such as pressurized air. The bellows is positioned in a chamber in an extrusion or similar structural member forming a portion of the door frame and has its inner end adapted to contact a linear piston member and bias it into contact with the edge of the sliding door member. A Teflon-coated linear metal cap member is resiliently attached to the end of the piston member to provide a flexible contact with the door edge that is capable of adjusting to gap variations and which has low sliding friction characteristics and will not freeze shut.

Figure 1:
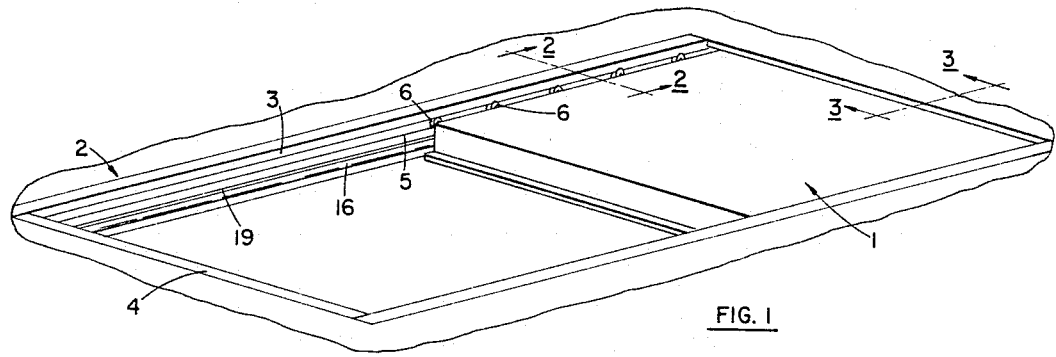
FIG. 1 is a perspective view of a sliding bomb bay door incorporating the present invention.
Figure 2:
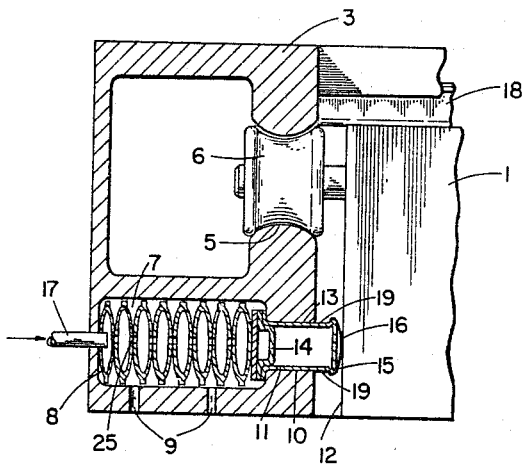
FIG. 2 is a transverse sectional view of the side seal taken along the plane of line 2—2 in FIG. 1 showing the seal of this invention in an expanded sealing condition.
Figure 5:
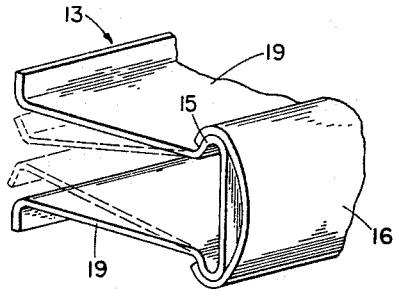
FIG. 5 is a fragmentary perspective view of the linear metal seal and Teflon coated cap member.

As shown in FIG. 1, the door assembly comprises a sliding door 1 designed to be moved longitudinally in one direction to effect an opening and to be moved in an opposite direction to close the opening. The door frame 2 may be formed of extrusion members of which the side or longitudinally extending extrusions 3 and transverse end extrusion 4 are of a configuration such as shown in FIG. 2. The side frame members 3 and the end frame member 4 form a U-shaped frame member for reception of the door panel with the panel sliding in and out of the open end of the U-frame. The inner sidewall of each of extrusion frame members 3 includes a track 5 with opposed convex surfaces for reception of a plurality of rollers 6 extending from the edge of the door panel and adapted to permit sliding of the doors in a longitudinal direction. A longitudinally extending chamber 7 is formed in the lower portion of frame member 3 for reception of the seal actuating member, metal bellows 8. Drain holes 9 are provided in the bottom of member 3 to drain chamber 7 of accumulated moisture and prevent freezing of the bellows. Chamber 7 communicates with the region within the frame member 3 by means of longitudinally extending slotted opening 10. Linear piston 11 is contained in opening 10 and has one end in chamber 7 adapted to be contacted by bellows 8 with its other end extending out of frame member 3 toward door edge 12. As best shown in FIGS. 2 and 5, piston 11 is advantageously formed of a sheet metal piston body portion 13 to substantially a U-shaped configuration which is adapted to abut against shoulders formed on a piston base member 14. This construction permits piston body portion 13 to be readily inserted or removed from chamber 7 and opening 10 by merely springing the leg portions 19 together as shown by the dotted outline in FIG. 5. The outer end of piston 11 is formed with ridges 15 at each edge. A spring-like arcuate linearly extending sheet metal cap strip 16 is formed to snap over the ridges 15 and provide resilient contact with door edge 12 and is sufficiently flexible to accommodate variations in the gap between the door frame extrusion members and the edge of the doors. Contact strips 16 and the outer surfaces of linear piston leg portions 19 are coated with Teflon (tetrafluoroethylene polymer) to provide a dry lubricating surface having a low coefficient of friction ($\mu=0.04$) for operating temperatures as high as 500° F. and which decreases with an increase in applied pressure. Teflon coatings on these surfaces also prevent such abutting metal surfaces from freezing together as ice will not adhere to Teflon. Positive actuation of the piston assembly comprised of piston 11 and cap strip 16 is achieved by the application of air pressure to the bellows through a plurality of conduits 17.

Figure 3:
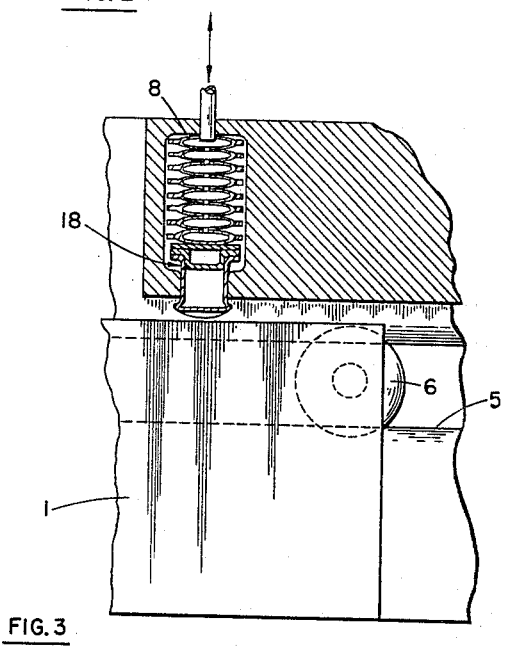
FIG. 3 is a fragmentary sectional view of the transverse end seal taken along the plane of line 3—3 in FIG. 1 showing the metal bellows in a retracted unexpanded condition.

At the open end of the U-frame the upper surface of the panel is sealed by a seal 18, as shown in FIG. 3 in a retracted position, in accordance with this invention as described above.

Figure 4:
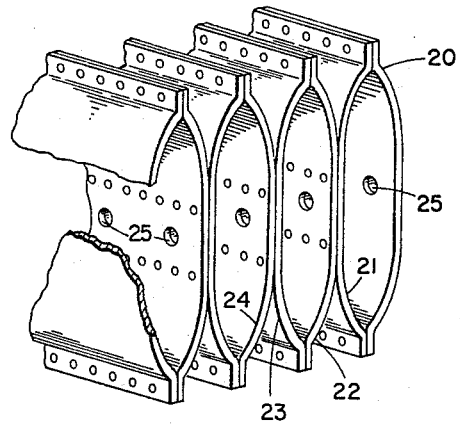
FIG. 4 is an enlarged perspective view, partly cutaway, of a portion of the metal bellows utilized in this invention showing the manner in which it is constructed.

The manner of constructing bellows 8 is shown in FIG. 4. Arcuately formed metal strips 20 and 21 which are provided with perforations 25 at frequent intervals are seam welded at their top and bottom flat outer edges to form a first bellows cavity or convolution. Strip 22 is then seam welded, back to back, to strip 21 by a double row of seam welds displaced a slight amount above and below the median plane of such strips. Strip 23 is then seam welded to strip 22 at the top and bottom edges, as before, and strip 24 is then welded, back to back, to strip 23 by parallel double seam welds along the median plane. In this fashion a linearly extending bellows of the requisite dimensions and characteristics may be fabricated.

While a particular embodiment of this invention has been illustrated and described herein, it will be apparent that various changes and modifications may be made in the construction and arrangements of the various parts without departing from the spirit and scope of this invention in its broader aspects, or as defined in the following claim.

We claim:

In a sealing arrangement for an exterior sliding retractable aircraft door assembly exposed to aerodynamic and wind forces, the combination of a door frame surrounding a door and having formed therein a track with opposed convex track surfaces and a linearly extending chamber adapted to receive an expansible member, said chamber having access to the interior of said door frame adjacent an edge portion of the door by means of an interconnecting linearly extending slotted opening in said door frame; a door having rollers projecting from edge portions thereof with said rollers having a surface of revolution complementary to and operatively contacting said opposed track surfaces to permit the door to slide longitudinally to open and closed positions with respect to said door frame while restraining movement in directions other than said longitudinal direction, the exterior portion of said door frame and said door that is exposed to the air stream forming a flush substantially continuous surface; a linearly extending slidable metallic piston extending through said linearly extending slotted opening adapted for movement into contact with an edge portion of said door for sealing the same, said piston including a resilient metallic strip removably attached to its inner end adjacent to said door for contacting an edge portion of said door, said piston and said resilient metallic strip having rubbing surfaces and having a dry film lubricant on such rubbing surfaces; a linearly extending expansible resilient metallic member in said linearly extending chamber for actuating said piston into sealing contact with an edge portion of said door, said resilient metallic member having a static retracted position whereby said piston is not forceably pressed into contact with said door when said resilient metallic member is in such static retracted position; and means for actuating said expansible metallic member into an expanded position by means of fluid pressure.

References Cited by the Examiner

UNITED STATES PATENTS

| | | | |
|---|---|---|---|
| 1,578,028 | 3/1926 | Healy | 20—19 |
| 2,445,315 | 7/1948 | Curley | 20—68 |
| 2,507,360 | 5/1950 | Wicks. | |
| 2,625,128 | 1/1953 | Sipkin | 114—201 |
| 2,657,661 | 11/1953 | Robson | 277—34 X |
| 2,843,422 | 7/1958 | Black. | |
| 3,103,446 | 9/1963 | FitzSimmons | 117—161 X |
| 3,124,032 | 3/1964 | Webster et al. | 117—161 X |
| 3,169,282 | 2/1965 | Godwin | 244—129 X |

FOREIGN PATENTS

| | | |
|---|---|---|
| 703,820 | 2/1954 | Great Britain. |
| 707,065 | 4/1954 | Great Britain. |
| 708,483 | 5/1954 | Great Britain. |
| 729,980 | 5/1955 | Great Britain. |

HARRISON R. MOSELEY, *Primary Examiner.*

W. E. HEATON, *Assistant Examiner.*